United States Patent [19]

Tilley et al.

[11] Patent Number: 4,973,455

[45] Date of Patent: Nov. 27, 1990

[54] RECOVERY OF LANTHANIDES

[75] Inventors: George L. Tilley, Littleton, Colo.; William E. Doyle, York, Pa.

[73] Assignee: Union Oil Company of California, Los Angeles, Calif.

[21] Appl. No.: 849,139

[22] Filed: Apr. 7, 1986

[51] Int. Cl.$^5$ ............................................. C01F 17/00
[52] U.S. Cl. ................................................... 423/21.1
[58] Field of Search ............................. 423/21.1, 21.5

[56]  References Cited

U.S. PATENT DOCUMENTS

| 3,193,351 | 7/1965 | Miller et al. | 23/165 |
| 3,353,928 | 11/1967 | Woyski et al. | 423/21.1 |
| 3,375,061 | 3/1968 | Healy et al. | 423/21.1 |
| 4,051,219 | 9/1977 | Hafner | 423/21.1 |

OTHER PUBLICATIONS

H. E. Kremers, "The Rare Earth Industry", *Journal of the Electrochemical Society*, vol. 96, pp. 152–157 (1949).
V. E. Shaw, "Extraction of Rare-Earth Elements from Bastnaesite Concentrate", U.S. Bureau of Mines Report of Investifations 5474 (1959).
*Phosphoric Acid*, vol. 1, Part II, A. V. Slack, ed., Marcel Decker, Inc., New York (1968), pp. 696–702, and 708.

*Primary Examiner*—John Doll
*Assistant Examiner*—Steven J. Bos
*Attorney, Agent, or Firm*—Walter A. Hackler

[57]  ABSTRACT

Lanthanide components are recovered from a fluorine-containing material by a method which comprises mixing the material with silica and sulfuric acid, heating the mixture to induce a reaction and volatilize fluorine compounds, and dissolving lanthanides from the reacted mixture with an aqueous medium. The silica is an acid-insoluble form, such as sand or diatomaceous earth. Heating should be to temperatures at least about 150° C. The method is particularly useful for recovering cerium from roasted, acid-leached bastnasite flotation concentrates.

5 Claims, No Drawings

RECOVERY OF LANTHANIDES

FIELD OF THE INVENTION

This invention relates to the field of mineral processing to recover valuable components and, more particularly, to the recovery of a lanthanide component from mineral concentrates.

INTRODUCTION TO THE INVENTION

A large fraction of the world's supply of lanthanide, or rare earth, elements (those having atomic numbers 57 through 71, plus the chemically related elements scandium and yttrium) and compounds is derived from deposits of the mineral "bastnasite," a mixed lanthanide fluorocarbonate. Bastnasite contains large amounts of cerium and lanthanum, with smaller amounts of neodymium, praseodymium, and other lanthanides having higher atomic numbers.

Mixed bastnasite ore is typically ground and subjected to froth flotation for separation from associated minerals such as calcite, barite, and silica. A further separation can be achieved by roasting the flotation concentrate in air, thereby oxidizing contained cerium to a tetravalent state, and then leaching the material with a dilute hydrochloric acid solution. Trivalent lanthanides are soluble in the acid, leaving a "cerium concentrate" residue which contains ceric oxide and impurities, including fluorine, thorium, phosphorus, sulfur, barium, calcium, and strontium. Of these impurities, the first four are generally the more objectionable, since they are the source of considerable disposal problems. Customers for the cerium concentrate would prefer to have the impurities removed before the concentrate is shipped to their facilities.

An alternative scheme for liberating the rare earth content of bastnasite was developed, using a sulfuric acid digestion step. This is reported by V. E. Shaw, "Extraction of Rare-Earth Elements From Bastnaesite Concentrate," U. S. Bureau of Mines Report of Investigations 5474 (1959), and involves reacting concentrates at temperatures above 400° F. with at least 1.3 pounds of sulfuric acid per pound of concentrate, leaching the sulfation product with cold water to solubilize rare earths, and precipitating the rare earths from the water solution. A better separation of impurities which have soluble sulfates was obtained when the sulfation product was calcined at 1200° F., before leaching.

Shaw reported that fluorine "was eliminated" by the sulfuric acid reaction, but no supporting data were given to indicate the extent of elimination. It was also stated that thorium remains in the water-insoluble sulfated residue, but can be recovered by leaching the residue with dilute sulfuric acid. Again, no quantitative information is available.

A disadvantage of the Shaw process is the loss of an opportunity to separate cerium from the other rare earths, which separation is quite effective and inexpensive with the previously described roasting-hydrochloric acid leaching procedure. One further disadvantage is the presence of thorium in a large mass of residue; since the disposal of thorium-containing wastes is something of a problem, due to its radioactive nature, it is preferred to recover this component in a concentrated form, to minimize the total quantity of radioactive wastes.

SUMMARY OF THE INVENTION

The invention provides a method for treating an impure lanthanide material, to separate the rare earth component from the contained impurities. This method includes the steps of: blending the lanthanide material with silica; mixing the blended materials with sulfuric acid; heating the mixture to elevated temperatures, which are maintained for sufficient time for extensive fluorine compound volatilization; and leaching with an aqueous medium to produce a solution of lanthanide ions which can be used to prepare desired compounds.

Fluorine is volatilized during the heating step and can be absorbed in various media for convenient recovery or disposal. Thorium is solubilized along with lanthanides and can be recovered in concentrated form by chemical separations.

DETAILED DESCRIPTION OF THE INVENTION

This invention is particularly useful for treating cerium concentrates, which have been prepared by roasting bastnasite flotation concentrate in air, then leaching with dilute hydrochloric acid to remove trivalent lanthanides. However, the invention can be used to recover lanthanides from other fluorine-containing compounds, minerals, or mixtures.

Material to be treated by the method of the invention should have maximum particle sizes about 300 micrometers. More preferably, the maximum particle size should be about 100 micrometers. Particle sizes can be reduced to these values using many types of grinding equipment, as is well known in the art.

Silica for use in the invention is silicon dioxide which is essentially insoluble in aqueous media and sulfuric acid. Such silica is available in various crystalline and amorphous forms, having varying degrees of purity, depending upon the origin of the material. Suitable silica for the present invention is at least about 75 percent by weight $SiO_2$; the least expensive materials are sand and diatomaceous earth products, such as those which are sold as filtration media.

The silica should have a maximum particle size about 300 micrometers, more preferably about 100 micrometers, for best results in the method. Silica particles which are larger than desired can be reduced in size by grinding, using methods and equipment which are well known in the art. In cases where the lanthanide material which is to be treated must also undergo particle size reduction, it is sometimes advantageous to mix the material with silica and grind the mixture; this can help to eliminate a separate blending step, following the particle size reduction.

Appropriately sized particles of lanthanide material and silica are intimately mixed, for treatment by the method of the invention. The amount of sand is not particularly critical, but should normally be in the range about 10 to about 40 percent by weight of the mixture. Many types of equipment are suitable for this operation, including tumblers, ribbon mixers, screw mixers, and the like. Characteristics of the equipment and mixing times should be chosen, to obtain a maximized homogeneity of the mixture. It should also be recognized that a close matching of particle sizes and size distributions of the components will assist in obtaining a homogeneous mixture.

The lanthanide material-silica blend is mixed with sulfuric acid, to form a slurry. It is preferred to use the commercially available concentrated sulfuric acid (>95 percent by weight $H_2SO_4$). Purity of the acid should be carefully considered, since water soluble impurities will contaminate the final lanthanide solution which is recovered. The sulfuric acid is added, with thorough mixing, in sufficient quantity to form a mixture having a weight ratio of sulfuric acid to lanthanide material about 1.0 to about 1.7, more preferably about 1.1 to about 1.5. Presently most preferred is a weight ratio about 1.3.

The sulfuric acid slurry tends to solidify, upon standing for about 20 to 30 minutes, so should be promptly placed into suitable containers or introduced into a heating apparatus while fluid.

After adding the sulfuric acid, the mixture is heated, using sufficient temperatures and times of heating to complete a reaction between the lanthanide material and sulfuric acid. While the mechanism of reaction is not fully known, and the invention is not to be bound to any particular theory of operation, it is considered possible that, as the lanthanide material reacts to form sulfates, fluoride ions are liberated. In the acidic environment of the mixture, fluoride reacts readily with silica to form volatile silicon fluorides and, possibly, compounds such as fluosilicic acid, $H_2SiF_6$.

Heating is normally to temperatures higher than about 150° C., more preferably at least about 200° C. Cerium reduction [probably resulting in the formation of $Ce_2(SO_4)_3$] becomes apparent as the temperature increases above about 300° C., and is complete at about 550° C. For this reason, if it is desired to recover cerium in the tetravalent state, temperatures less than about 300° C. should be maintained. For reasons of economy, heating will be to the lowest effective temperature, preferably in the range about 200° C. to about 300° C., and cerium will be maintained in a tetravalent state.

At 200° C., at least about 3 hours, more preferably at least about 4 hours, are required for a maximized removal of fluorine from the reaction mixture. No particular benefit has been found from increased heating times, much beyond four hours. During the heating period, volatile fluorine-containing compounds are released from the acid-lanthanide mixture. These compounds should be collected, to avoid environmental contamination with hazardous materials. It has been found that simply scrubbing the vapors with an alkaline aqueous solution (e.g., a solution of an alkali metal hydroxide) effectively removes not only the fluorine compounds, but also sulfuric acid and its decomposition products (e.g., $S_2$) which may be present.

This heating can be conducted as a batch operation, such as by placing containers (fabricated from a sulfuric acid resistant material, e.g., ceramic), filled with the acid-lanthanide material mixture, into a suitable oven or other heating chamber. Alternatively, the heating can be semi-continuous, as by placing the containers upon a conveying mechanism for transport through a heating chamber. Heating the mixture can also be made a continuous operation, using equipment such as a rotary kiln or a heated mixing device for solids. The various methods for heating substances are well-known in the art and the method used for this invention is not critical.

After concluding the heating, the sulfated material is cooled, crushed if necessary, and leached with an aqueous medium to solubilize lanthanide sulfates. Normally, cold water is used, due to the decreased solubility of the sulfates in hot water. Weight ratios of aqueous medium to sulfated material should be adjusted in view of the desired concentration of soluble species; of course, the solubility of lanthanide sulfates will establish a lower limit of the ratio. Thorium, calcium, and phosphorus, plus small amounts of other impurities will accompany the lanthanides in the solution, but these can be separated by chemical means known in the art.

Following the leaching, the solution is separated from insoluble solids. This can be accomplished by many methods which are well known in the art, including filtration, centrifugation, settling and decantation, and others. To remove entrained lanthanide-containing liquors, it is advisable to wash the separated solids with one or more small quantities of water, which water is then combined with the solution. The solid materials can be discarded or processed to recover any desired components.

The invention is further illustrated by the following examples which are illustrative of various aspects of the invention and are not intended to limit the scope of the invention as defined by the appended claims.

EXAMPLE I

A bastnasite-derived cerium concentrate, prepared by roasting bastnasite ore flotation concentrate and leaching the roasted material with dilute hydrochloric acid, and having a composition as summarized in Table 1, is mixed with 1.3 times its weight of 95 percent by weight sulfuric acid and heated about four hours at about 200° C. After cooling, the product is analyzed to determine its fluorine content.

Three separate samples of the cerium concentrate are carried through the procedure, giving fluorine removals of 93.5, 93.8, and 93.3 percent.

TABLE 1

| Component | Wt. Percent |
| --- | --- |
| Ce | 59.0 |
| Si | 0.03 |
| Th | 0.17 |
| F | 9.6 |

EXAMPLE II

The procedure of the preceding example is repeated, using the same materials and relative amounts, except that silicic acid (hydrated silica) is added, in an amount equal to fifteen percent of the cerium concentrate weight.

When silicic acid is mixed with cerium concentrate before acid is added, the procedure gives a fluorine removal of 76.9 percent. When silicic acid is added to sulfuric acid, before the acid is mixed with cerium concentrate, a fluorine removal of 87.0 percent is obtained.

These results indicate that fluorine removal with sulfuric acid is not enhanced by the addition of soluble silica.

EXAMPLE III

The cerium concentrate of Example I is combined with 25 percent of its weight of sand and the mixture is ground to a flour-like consistency. Sulfuric acid (95 percent by weight) is added, in an amount which is 1.3 times the weight of cerium concentrate or 1.04 times the weight of admixed cerium concentrate and sand. This mixture is heated about four hours at about 200° C., is cooled, and is analyzed to determine the fluorine content.

A fluorine removal of 97.4 percent is obtained, thus demonstrating the enhanced fluorine removal by the present invention, over that of Example I.

When the sulfated product is leached with cold water, filtered, and washed with additional cold water, a residue is obtained which weighs 36.5 percent of the original cerium concentrate weight. This residue contains 5.7 percent by weight cerium and less than 0.05 percent by weight thorium; about 97 percent of the original cerium content is solubilized by the procedure.

EXAMPLE IV

The procedure of the preceding example is repeated, using varying amounts of sulfuric acid. For purposes of comparison, parallel treatments of cerium concentrate are made, without sand additions. Results are obtained as shown in Table 2, indicating an optimum weight ratio of sulfuric acid to cerium concentrate about 1.3, when sand is present in the mixture.

TABLE 2

| Weight H$_2$SO$_4$ | Percent Fluorine Removal | |
| --- | --- | --- |
| Wt. Ce Conc. | With Sand | Without Sand |
| 0.9 | — | 79.5 |
| 1.0 | 92.1 | 83.5 |
| 1.1 | — | 86.7 |
| 1.15 | 96.4 | — |
| 1.3 | 97.4 | 93.5 |
| 1.4 | — | 94.8 |
| 1.5 | 95.7 | 96.7 |

EXAMPLE V

The method of the invention is conducted, using a large batch reactor. Bastnasite-derived cerium concentrate (containing 68.2 percent by weight Ce$_2$, 0.165 percent by weight ThO$_2$, and 9.6 percent by weight F), 98 percent by weight sulfuric acid, and sand (previously ground to pass through a 325 mesh sieve, having 45 μm openings) are introduced into a polymer-lined, jacketed ribbon blender. Steam is passed through the jacket, to heat the reacting mixture to about 200° C. Average residence time for material in the apparatus is about 3 hours. Amounts of material charged the blender are as follows: cerium concentrate 50 pounds; sulfuric acid 65 pounds; and sand 12.5 pounds.

About 120 pounds of reaction product are obtained from the blender. This material is cooled and introduced into a stirred tank containing water. From this tank, a cerium-containing solution and a solid residue, containing 6 percent by weight cerium and 0.02 percent by weight thorium, are recovered. About 95 percent of the original cerium contained in the concentrate has been solubilized.

While various specific embodiments and modifications of this invention have been described in the foregoing specification, further modifications will be apparent to those skilled in the art. Such further modifications are included within the scope of the invention as defined by the following claims.

What is claimed is:

1. A method for recovering a lanthanide and thorium from a material containing a fluorine compound and said lanthanide and thorium, the method comprising the steps of:
   a. obtaining said material from a roasted, acid-leached batnasite ore;
   b. forming a mixture of said material with at least about ten weight percent of silica;
   c. contacting said mixture with sulfuric acid;
   d. heating the mixture and sulfuric acid to a temperature which causes substantially all of the fluorine to be released as a volatile material containing silicon and fluorine;
   e. contacting the reacted mixture with an aqueous medium consisting essentially of water so as to solubilize the lanthanide and thorium while leaving an insoluble residue; and
   f. separating the aqueous solution of the lanthanide and thorium from the insoluble residue.

2. The method defined in claim 1 wherein the silica is selected from the group consisting of sand and diatomaceous earth.

3. The method defined in claim 1 wherein the step of heating the mixture includes heating the mixture to a temperature of at least about 150° C. for at least about 3 hours.

4. The method defined in claim 1 wherein said mixture is in the form of particles and wherein at least some of said particles have sizes greater than about 300 micrometers and including the step of reducing the size of the particles greater than about 300 micrometers to a size of no more than about 300 micrometers.

5. A method for recovering a lanthanide and thorium from a material containing a fluorine compound and said lanthanide and thorium, the method comprising the steps of:
   a. obtaining said material from a roasted, acid-leached bastnasite ore;
   b. forming a mixture of said material with at least about ten weight percent of silica;
   c. contacting said mixture with sulfuric acid;
   d. heating the mixture and sulfuric acid to a temperature of at least about 150° C. for at least about 3 hours so as to cause substantially all of the fluorine to be released as a volatile material containing silicon and fluorine;
   e. contacting the reacted mixture with an aqueous medium consisting essentially of water so as to solubilize the lanthanide and thorium while leaving an insoluble residue; and
   f. separating the aqueous solution of the lanthanide and thorium from the insoluble residue.

* * * * *